US012012313B2

(12) United States Patent
Kraupatz

(10) Patent No.: US 12,012,313 B2
(45) Date of Patent: Jun. 18, 2024

(54) CRANE

(71) Applicant: Liebherr-Werk Biberach GmbH, Biberach an der Riss (DE)

(72) Inventor: Matthias Kraupatz, Biberach-Ringschnait (DE)

(73) Assignee: Liebherr-Werk Biberach GmbH, Biberach an der Riss (DE)

(*) Notice: Subject to any disclaimer, the term of this patent is extended or adjusted under 35 U.S.C. 154(b) by 574 days.

(21) Appl. No.: 17/200,562

(22) Filed: Mar. 12, 2021

(65) Prior Publication Data

US 2021/0221656 A1 Jul. 22, 2021

Related U.S. Application Data

(63) Continuation of application No. PCT/EP2019/072417, filed on Aug. 22, 2019.

(30) Foreign Application Priority Data

Sep. 13, 2018 (DE) ..................... 10 2018 122 349.8

(51) Int. Cl.

| | |
|---|---|
| ***B66C 23/60*** | (2006.01) |
| ***B66C 23/02*** | (2006.01) |
| ***B66C 23/16*** | (2006.01) |
| ***B66C 23/64*** | (2006.01) |
| ***B66C 23/72*** | (2006.01) |

(52) U.S. Cl.

CPC ............ *B66C 23/64* (2013.01); *B66C 23/022* (2013.01); *B66C 23/16* (2013.01); *B66C 23/72* (2013.01)

(58) Field of Classification Search

CPC ..... B66C 23/16; B66C 23/163; B66C 23/166; B66C 23/53; B66C 23/64; B66C 23/66; B66C 23/72; B66C 23/02

See application file for complete search history.

(56) References Cited

U.S. PATENT DOCUMENTS

2017/0275143 A1* 9/2017 Orlean .................... B66C 23/70

FOREIGN PATENT DOCUMENTS

| | | | | |
|---|---|---|---|---|
| CH | 667447 | A5 * | 10/1988 | ............ B66C 23/26 |
| CN | 2261415 | Y | 9/1997 | |
| CN | 201040692 | Y | 3/2008 | |
| CN | 201971572 | | 9/2011 | |
| CN | 102491199 | | 6/2012 | |
| CN | 102942124 | | 2/2013 | |
| CN | 203345966 | U | 12/2013 | |
| CN | 203767890 | U | 8/2014 | |

(Continued)

OTHER PUBLICATIONS

"The EC-B Flat-Top Cranes" of Liebherr-Werk Biberach GmbH.

*Primary Examiner* — Emmanuel M Marcelo

(74) *Attorney, Agent, or Firm* — Levine Bagade Han LLP

(57) ABSTRACT

The present invention relates to a crane, in particular in the form of a revolving tower crane, having a jib (3) and a counter-jib (4), which are articulated on a jib articulation piece (8), wherein the jib (3) comprises an outer jib part (3*a*), which is articulated on an inner jib part (3*i*) in a hinged manner and is held by a guy (10). According to the invention, the inner jib part (3*i*) is in the form of a cantilever, which is fastened to the jib articulation piece (8) in a flexurally rigid manner and held, wherein the outer jib part (3*a*) is articulated on the cantilever in a hinged manner and is held by the guy (10).

20 Claims, 3 Drawing Sheets

(56) References Cited

FOREIGN PATENT DOCUMENTS

| | | | | | |
|---|---|---|---|---|---|
| CN | 203820334 | U | | 9/2014 | |
| CN | 104192737 | | | 12/2014 | |
| CN | 204643652 | U | | 9/2015 | |
| CN | 106542444 | | | 3/2017 | |
| CN | 108190766 | | | 6/2018 | |
| DE | 3510116 | C2 | * | 2/1988 | ............ B66C 23/26 |
| DE | 102005018522 | B4 | | 9/2008 | |
| DE | 202017107301 | U1 | | 1/2019 | |
| EP | 1024106 | | | 5/2005 | |
| EP | 2041017 | B1 | | 4/2012 | |
| ES | 2264334 | | | 12/2006 | |
| GB | 1493715 | | | 11/1977 | |
| SU | 1082749 | | | 3/1984 | |
| SU | 1654255 | | | 6/1991 | |
| WO | WO 2020/052931 | | | 3/2020 | |

* cited by examiner

CRANE

CROSS-REFERENCE TO RELATED APPLICATIONS

This application is a continuation of International Patent Application Number PCT/EP2019/072417 filed Aug. 22, 2019, which claims priority to German Patent Application Number DE 10 2018 122 349.8 filed Sep. 13, 2018, the contents of which are incorporated herein by reference in their entireties.

BACKGROUND

The present invention relates to a crane, in particular in the form of a revolving tower crane, having a boom and a counterboom that are connected in an articulated manner to an articulated boom piece, wherein the boom comprises an outer boom part that is pivotally connected in an articulated manner to an inner boom part and is held by a guying.

It is known to guy the boom to be able to take up large loads with revolving tower cranes having relatively great outreaches, i.e. large boom lengths, with typically one, two, or also three guy ropes or guy bars being guided from a tower top that projects above the boom to the boom and being fastened there. Depending on the boom length, the articulation points of the guy ropes or guy bars at the boom can be approximately central or can be disposed in an inner third and/or in an outer third. “Inner” here means a boom section disposed closer to the tower and “outer” means a boom section that projects further and is further spaced apart from the tower. For example, a first guy bar can be fastened at approximately one third of the total boom length and a second guy bar can be fastened at approximately two thirds of the total boom length. “Total” boom here means the boom without a counterboom, that is that boom part on which the trolley travels.

If a counterboom that bears the ballast weight is present, the guying is typically also led rearwardly to this counterboom. With revolving tower cranes without a counterboom, the guying is led downwardly over the then rearwardly inclined tower top or guy brace.

Revolving tower cranes have also become popular more recently that dispense with such a boom guying and instead reinforce the boom itself so much that it can take up the forces as a bending beam boom. Such topless revolving tower cranes are sometimes called flat-top cranes or also topless cranes or hammer head cranes since they lack the tower top projecting above the boom. Important advantages of such topless revolving tower cranes are substantially the lower height and a simple installation routine.

Document EP 2 041 017 B1 shows such a topless revolving tower crane and proposes an assembly process for it that is intended to simplify the construction of the crane. Document DE 10 2005 018 522 B4 likewise shows such a topless revolving tower crane, wherein the bending beam boom that is free of guying overall should have a plurality of bearing points to be able to be installed at different points at the upper tower end such that the counterboom has a greater length at one time and a smaller length at another time. A further topless revolving tower crane is known, for example, from the document GB 14 93 715 or from the brochure “The EC-B Flat-Top Cranes” of Liebherr-Werk Biberach GmbH.

ES 22 64 334 A1 shows a comparison between a guyed revolving tower crane with a tower top and a topless flat-top crane. It is proposed therein to install the counterboom a little higher than the boom to further simplify the assembly.

Revolving tower cranes in which the boom guying is kept very short are known, for example, from the Spanish company of JASO under the type rating of the H series, for example model version J560. The boom there is relatively solid up to the boom tip to be able to take up the bending forces and bend torques that are adopted, which makes the crane relatively heavy and solid overall.

It is generally disadvantageous with topless revolving tower cranes that due to the high boom bending moments high component weights and dimensions of the boom components that are unfavorable to transport are required, in particular with large-dimension cranes >300 mt. To be able to receive the high boom bending moments, in particular in the inner boom section that is close to the tower, they require further inwardly disposed boom parts, a large boom height, and solidly dimensioned horizontal webs.

Starting from this, it is the underlying object of the present invention to provide an improved crane of the initially named type which avoids disadvantages of the prior art and further develops the latter in an advantageous manner. A simpler installation of the boom and of the guying of the crane should in particular also be achieved, in particular also by reducing the installation weights, without having to accept static disadvantages with respect to the rated capacity.

SUMMARY

The named object is achieved in accordance with the invention by a crane.

It is therefore proposed to combine an articulated guying boom with a bending beam boom and to set up the boom from two differently configured and differently held boom parts. In accordance with the invention, the inner boom part is configured as a bending beam 8 that is flexurally rigidly fastened and held at the articulated boom piece, while the outer boom part is pivotally connected in an articulated manner to the bending beam and is held by a guying. The installation of the crane is considerably simplified by such a hybrid configuration of the boom. On the one hand, the installation effort for the inner boom part is considerably reduced since the bending beam only has to be fastened to the articulation piece and is hereby already held in a stable manner. On the other hand, however, the effort for the attachment of the guying is also reduced since, in comparison with the customary double-guyed boom variants, only the outer boom part has to be guyed and the guying frame of conventional guying variants can optionally be omitted. The installation weight is furthermore also reduced, in particular when the central part or the articulation piece is formed as divided. A statically determined system is finally obtained.

Said inner boom part can in particular remain fully without guying and be held solely by the flexurally rigid connection to the boom piece so that the guying only goes to the outer boom part and only the outer boom part is guyed.

To be able to effectively intercept and lead off the different strains, it can be meaningful in a further development of the invention to configure the inner and outer boom parts differently with respect to their designs and their profiles. The inner boom part, that is configured as a bending beam, can advantageously comprise more longitudinal webs than the outer boom part. The inner boom part can, for example, be made up of four longitudinal webs, while the outer boom part is only formed from three longitudinal webs so that the inner boom part has a rectangular or trapezoidal profile while the outer boom part can have a triangular profile in cross-section.

Independently of the longitudinal web number, both the inner boom part and the outer boom part can each be formed as a bar frame in which longitudinal webs are rigidly connected to one another by transverse webs or transverse braces.

The boom is advantageously configured as a trolley boom The inner boom part and the outer boom part can in particular have two longitudinal webs—independently of their respective number of longitudinal webs—that have a spacing that remains the same over the boom length and/or can form a continuous track over the interface between the inner and outer boom parts.

The boom sections can optionally be configured differently in their height—viewed in profile or cross-section—with the cross-sectional profile of the outer boom part in particular being able to have a smaller height than the profile cross-section of the inner boom part. If the inner boom part does not have an unchanging profile height over its length, for example because a boom piece having a reducing profile height and/or a reduced profile height is provided toward the end of the inner boom part, at least an inner section of the inner boom part—that is a piece of the inner boom part arranged toward the articulation piece and/or a piece of the inner boom part fastened thereto—can have a profile cross-section height that is larger than a maximum profile cross-section height of the outer boom part.

The guying for the outer boom part can generally be configured differently, with different guying variants advantageously being able to be provided for different boom lengths.

In an advantageous further development of the invention, the guying for the outer boom part can be formed in one strand, with two guying ropes or guying bars running in parallel absolutely also being able to be provided in such a single-strand design that can be lashed to the outer boom part at the same distance from the articulation piece. A single guying rope or a single guying bar can, however, in particular also be guided to the outer boom part.

Said guying can be guided from the outer boom part to the inside beyond the inner boom part in different manners and can selectively be directly fastened to the articulation piece to which the inner boom part designed as a bending beam is also lashed or can be guided to a guying tip that is placed on said articulation piece.

To be able to variably configure the guying, a releasable connection between said boom tip and the articulation piece can be provided in an advantageous further development so that different, in particular differently high guying tips can be placed onto the articulation piece to which the inner boom part is flexurally rigidly fastened depending on the manner in which the guying should be led back inwardly from the outer boom part.

The guying can, for example, extend from a guying tip to the outer boom part at an unchanging acute angle to the longitudinal axis of the boom and/or a guying support or a guying frame between the two articulation points of the guying can be dispensed with at the outer boom part, on the one hand, and at the guying tip at the articulation piece, on the other hand, so that the guying is tensioned in a freely bearing manner between the outer boom part and the guying tip.

Alternatively, a guying tip of a smaller height can also be installed at the articulation piece and/or the guying can be guided over a guying support so that the guying extends substantially or at least approximately in parallel with the longitudinal axis of the inner boom part. In this case, the guying first increases from its articulation point at the outer boom part at an acute angle upwardly inclined toward the inner boom part until the guying impacts said guying support to extend from the guying support inwardly approximately in parallel with the longitudinal axis of the inner boom part.

Said guying support can generally be attached to different points of the boom, for example in the region of the bending beam. It can in particular be advantageous for said guying support to be attached approximately in the region of the interface between the inner boom part and the outer boom part.

The height of said guying support can project beyond the maximum height of the inner boom part or its profile, for example by an amount that can approximately correspond to the height of the profile of the inner boom part. Different guying support heights can, however, nevertheless also be meaningful depending on the geometry and structure of the boom.

Alternatively to a longitudinally parallel guidance of the guying above the inner boom part, the guying can also be configured as falling inwardly toward the articulation piece and/or can in particular be guided to the articulation piece itself at which the inner bending beam part of the boom is also fastened. A guying tip on the articulation piece can in particular also be fully dispensed with, with in this case the guying for the outer boom part being guided directly to the articulation piece.

Different guying variants can be implemented in a simple manner by the releasable connection of the guying tip to the articulation piece. A releasable pin connection can, for example, be provided as releasable connection means between the guying tip and the articulated boom piece. The releasable connection means between the articulation piece and the guying tip are advantageously rigid to achieve a fixed, rigid connection of the guying tip to the articulation piece.

In a further development of the invention, the counterboom can advantageously also be configured differently and/or can be adapted to the respective boom configuration. Said counterboom and/or a counterboom guying can in particular be adapted to the guying of the boom and/or the respectively used guying tip and/or a guying tip not used.

Said counterboom can here advantageously likewise be configured as a hybrid boom and can comprise an inner counterboom part that can be configured as a bending beam that can be flexurally rigidly fastened to the articulation piece to which the boom is also fastened.

The counterboom can furthermore comprise an outer counterboom part that is pivotally connected in an articulated manner to the inner counterboom part and that is held by a counterboom guying. Said outer counterboom part can take up the ballast weight and/or bear further functional components such as the hoist winch for the hoist rope.

The counterboom guying holding the outer counterboom part can be adapted to the guying of the boom and can advantageously be there lashed at its inner end where the guying of the boom is also lashed.

If a guying tip is provided at the articulation piece, the counterboom guying is advantageously lashed to said guying tip. Depending on the height of said guying tip, the counterboom guying can here be guided from its articulation point at the outer counterboom part back to the inside in different manners.

The counterboom guying can advantageously be guided over a guying support that can vertically project over the maximum height of the inner counterboom part. Independently of this, such a guying support for the counterboom guying can be attached to a different point, for example in the region of the inner counterboom part. Said counterboom guying support can in particular be provided in the region of the interface between the inner counterboom part and the outer counterboom part.

The counterboom guying support can advantageously considerably project vertically above the counterboom and can, for example, be formed as comparably as high as the guying tip that is fastened to the articulation piece so that the counterboom guying has a somewhat approximately horizontal extent in the region between the guying support and the guying tip.

The guying support used at the counterboom can therefore advantageously be adapted in its height to the used guying tip.

Alternatively, the counterboom guying can, however, also be lashed to the inner counterboom part that is configured as a bending beam, in particular at an upper longitudinal web of the inner counterboom part or an articulated guying part connected thereto.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
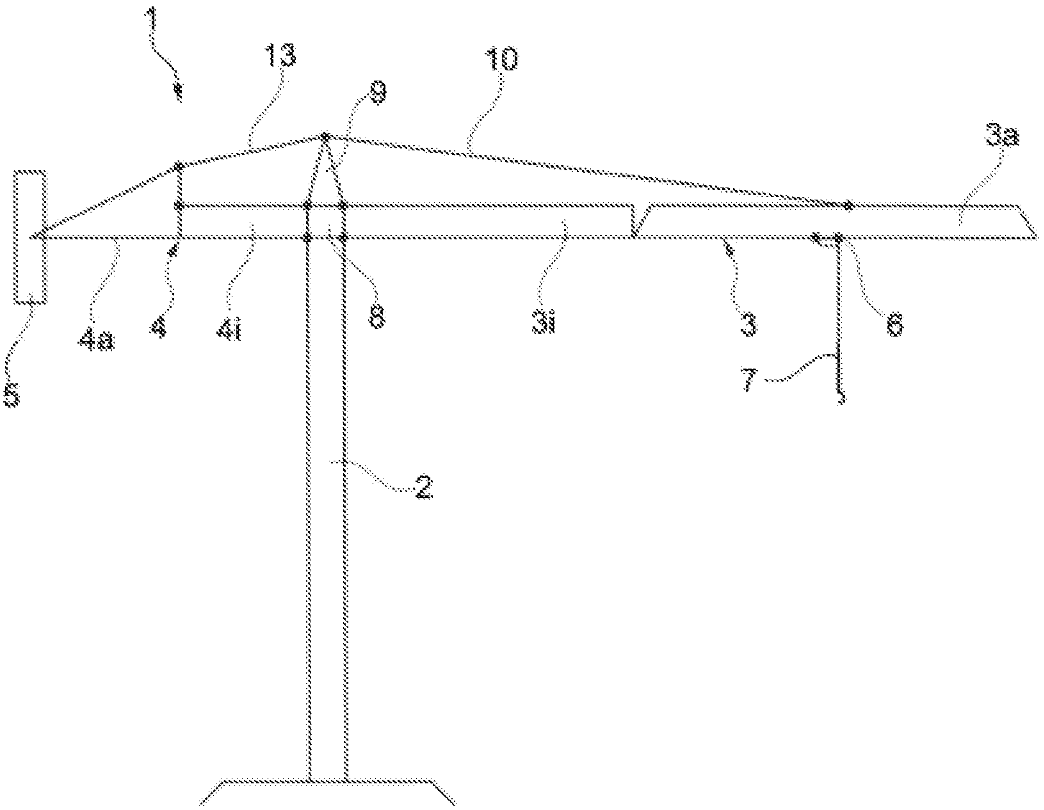
FIG. 1 a side view of a crane in the form of a revolving tower crane of an advantageous embodiment of the invention.

As the Figures show, the crane 1 can be configured as a revolving tower crane that comprises a tower 2 standing upright. Said tower 2 can be formed as a bar frame and can, for example, have a rectangular cross-section.

A boom 3, that can typically be aligned in a level manner, in particular approximately horizontally, is connected in an articulated manner to the upper end of the tower 2. A counterboom 4 that can likewise be arranged in a level manner, in particular horizontally, and that can bear a ballast weight 5 can be provided at the side of the tower 2 opposite the boom 3.

A trolley 6 can be arranged longitudinally travelably in a manner known per se at the boom 3 to be able to lower and raise the hoist rope 7 and the lifting hook connected thereto closer to the tower 2 or further away from the tower 2. The hoist rope 7 can advantageously be lowered and raised with the aid of a hoisting gear 16 that can be arranged at the counterboom 4 in the vicinity of the ballast weight 5.

As FIG. 1 shows, both the boom 3 and the counterboom 4 can be fastened to an articulation piece 8 that can be attached to or arranged at the upper end of the tower 2. If the crane is a top-slewer, said articulation piece 8 can be seated on the bearing ring of a slewing gear. If the crane is a bottom-slewer, said articulation piece 8 can be rigidly connected to the 9 tower 2 and/or can form its topmost piece.

A guying tip 9 to which the guying apparatus for the boom 3 and the counterboom 4 can be lashed can furthermore be seated on said articulation piece 8, as will still be explained in more detail.

Figure 2:
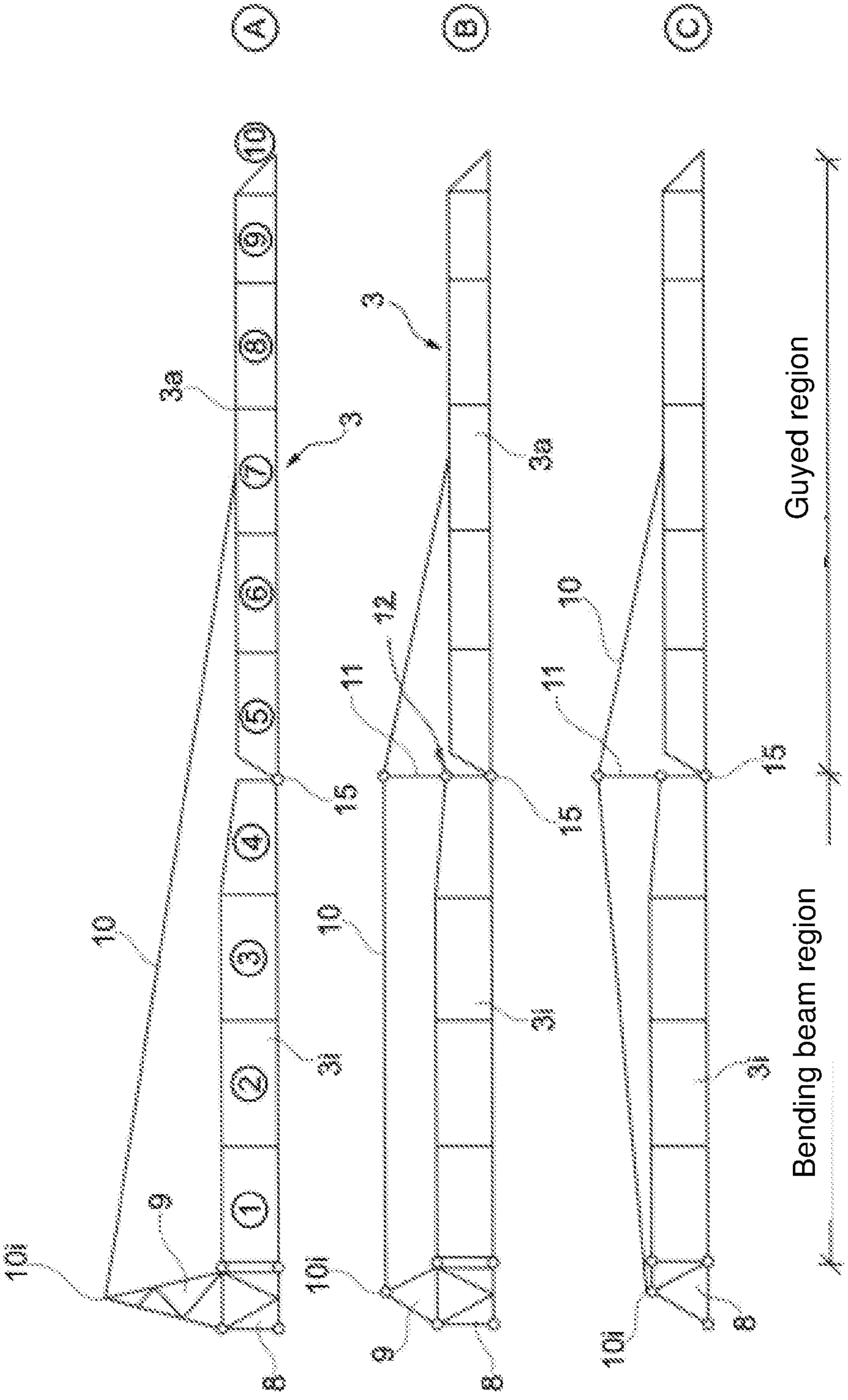
FIG. 2 a side view of the boom of the crane of FIG. 1 that faces the interior boom part formed as a bending beam and the outer, guyed boom part, with the partial views A, B, and C showing different guying variants of the guying of the outer boom part with differently high guying tips and without a guying tip.

As FIG. 2 shows, the boom 3 comprises an inner boom part **3*i* and an outer boom part 3*a* that is pivotally connected in an articulated manner to the outer end of the inner boom part 3*i*. “Inner” and “outer” mean the outreach or the distance from the tower 2. The inner boom part 3*i* is disposed closer to the tower 2 than the outer boom part 3*a***.

As FIG. 2 shows, the inner boom part **3*i* is configured as a bending beam that is rigidly and flexurally rigidly fastened to said articulation piece 8, for example by a pin connection or by another shape matching connection of the upper webs and the lower webs of the inner boom part 3*i* at said articulation connection 8. If the inner boom part 3*i* is drawn downward or loaded by the trolley 6 or also by its own weight, the upper web or webs are tensioned and the lower web or webs are compressed, with the bending torque being introduced into the articulation piece 8 or being intercepted by the articulatio piece 8**.

As FIG. 1 shows, the inner boom part **3*i*** formed as a bending beam can remain free of guying.

The guying 10 can hold the outer boom part **3*a* on its own or can only be guided to the outer boom part 3*a* that is held by said guying 10**.

As FIG. 2 shows, both boom parts, i.e. the inner and outer boom parts **3*i* and 3*a***, can each be configured as frame bearers and/or can be composed of a plurality of boom pieces. Such a frame design can in particular comprise upper webs and lower webs extending in the longitudinal direction being rigidly connected to one another by transverse braces and in particular forming a rigid frame structure.

The lower webs can here form tracks for the trolley 6.

The inner and outer boom parts **3*i* and 3*a* can here be configured differently. The inner boom part 3*i* can in particular have a larger profile cross-section and/or have more longitudinal webs than the outer boom part 3*a*. For example, the boom pieces of the inner boom part 3*i*** can each have four longitudinal webs and the boom pieces of the outer boom part can only have three longitudinal webs, with the inner boom part being able to have a rectangular or trapezoidal profile cross-section having two upper webs and two lower webs, while the outer boom part can have a triangular profile cross-section having one upper web and two lower webs.

As FIG. 2 shows, the guying 10 for the boom 3 can be formed in one strand.

In accordance with the embodiment variant A of FIG. 2, the guying 10 can be guided directly and without interposed guying supports from the outer boom part **3*a* to the guying tip 9**.

Alternatively, the guying 10 an also be guided over a guying support 11 that projects over the upper side of the boom 3 between the two lashing ends of the guying 10. Such a guying support 11 can, for example, be arranged in the region of the joint 15 between the inner and outer boom parts 3 and can, for example, be fastened to the projecting end 12 of the inner boom part 3 formed as a bending beam. It would generally also be possible, however, to arrange said guying support 11 further inwardly toward the tower 2 or also further outwardly at the outer boom part **3*a***.

On provision of such a guying support 11, the guying tip 9 provided at the tower 2 can have a smaller height than the partial view B of FIG. 2 shows. The guying support 11 and the guying tip 9 can in particular project substantially equally far upwardly over the boom 3 so that the guying 10 can extend approximately in parallel with the longitudinal axis of the boom 3, more precisely of the inner boom part 3*i*, and only lowers outwardly from the guying support 11 at an acute angle to the outer boom part 3*a*, cf. FIG. 2B.

It is furthermore possible, as the partial view C of FIG. 2 shows, to fully dispense with the guying tip 9 and to lash the guying 10 directly to the articulation piece 8. In this case, the guying 10 lowers inwardly from the guying support 11 toward the tower 2 at an acute angle to the longitudinal axis of the boom 3.

To be able to provide or mutually replace the different guying variants in a simple manner, the guying tip 9 and the articulation piece 8 can advantageously be formed separately from one another and can be releasably connected to one another. For example, the guying tip can be rigidly connected or latched to the articulation piece 8 by a pin connection or by a 6 similar shape matched connection. If the pins or the connection means are released, the guying tip 9 can be removed and replaced with a different guying tip or completely eliminated.

Figure 3:
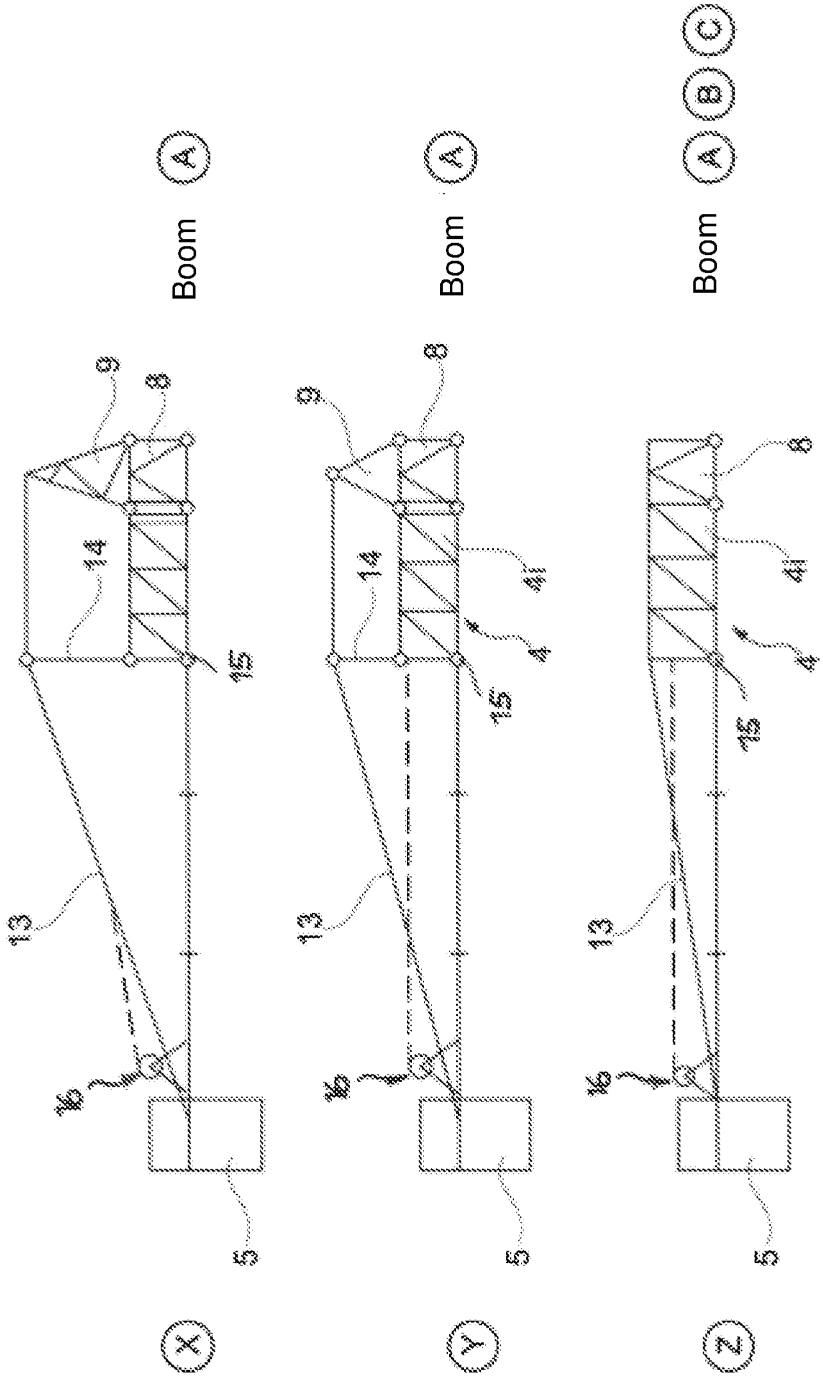
FIG. 3 a side view of the counterboom of the crane of FIG. 1, with the partial views X, Y, and Z showing different guying variants of the counterboom guying.

As FIG. 3 shows, the counterboom 4 can also have an inner counterboom part 4*i* that is configured as a bending beam and can be flexurally rigidly connected to the articulation piece 8, for example by a rigid connection such as a pin connection of the upper and lower 11 webs of the inner counterboom part 4*a* at said articulation piece 8.

The inner counterboom part 4*i* can likewise be configured as a frame bearer with upper and lower webs, cf. FIG. 3.

An outer counterboom part 4*a* can be fastened in an articulated manner to said inner counterboom part 4*i* and can be held by a counterboom guying 13.

Said counterboom guying 13 can likewise be formed in one strand, but with a multistrand counterboom guying also being possible.

As FIG. 3 shows, the counterboom guying 13 can be guided from an outer end section of the counterboom 4 to the guying tip 9 at which the guying 10 for the boom 3 is also lashed. The counterboom guying 13 can here advantageously be guided over a guying support 14 that is provided, for example, in the region of the joint 15 between the inner and outer counterboom parts 4*i* and 4*a*, with here, however, a positioning of the guying support 4 further outwardly or further inwardly also being possible. As the partial views X and Y of FIG. 3 show, said guying support 14 can in particular be connected in an articulated manner to the outer end section of the inner counterboom part 4*i*.

Said guying support 14 can be adapted in its height above the counterboom 4 to the height of the guying tip 9, in particular such that the counterboom guying 13 is guided approximately horizontally and/or in parallel with the longitudinal axis of the inner counterboom part 4*i*.

As the partial view Z of FIG. 3 shows, the counterboom guying 13 can, however, also be lashed directly to the inner counterboom part 4*i* that is configured as a bending beam, in particular to the upper longitudinal web of the inner counterboom part 4*i* or a guying bearer connected thereto.

The embodiments of the counterboom guying 13 in accordance with the partial views X and Y of FIG. 3 match the statements on the guying 10 of the boom 3 as are shown in the partial views A and B of FIG. 2.

The variant of the counterboom guying 13 in accordance with partial view Z of FIG. 3 can, in contrast, be used for all the variants or independently of the configuration of the guying 10 of the boom 3, i.e. the counterboom guying 13 in accordance with the partial view Z of FIG. 3 matches all the variants such as FIG. 2 shows in its partial views A. B. and C.

The guying variants for the outer boom part 3*a*, as FIG. 2 shows in its different partial views, can be suitably selected for different variants or outreaches and/or payloads of the boom 3. For shorter booms 3, the guying 10 can optionally also be fully dispensed with and the outer boom part 3*a* can be flexurally rigidly fastened to the inner boom part 3*i*, in particular by a shape matched connection of the upper webs.

The ratio of the lengths of the inner boom part 3*i* and of the outer boom part 3*a* can generally be selected as different, with favorable ratios generally resulting when the length of the inner boom part is in the range from 25% to 75% or 30% to 60% or 35% to 50% of the total length of the boom and the length of the outer boom part 3*a* amounts to 75% to 25% or 70% to 40% or 65% to 50% of the total length of the boom 3.

I claim:

1. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein the inner boom part has a profile cross-sectional height larger than a maximum profile cross-sectional height of the outer boom part and/or has a profile cross-sectional area larger than a maximum profile cross-sectional area of the outer boom part.

2. The revolving tower crane of claim 1, wherein the inner boom part is held without guying and wherein the boom is only guyed at the outer boom part.

3. The revolving tower crane of claim 1, wherein the inner boom part comprises more longitudinal webs than the outer boom part, and wherein the inner boom part has four longitudinal webs and a rectangular or trapezoidal profile cross-section, and wherein the outer boom part has three longitudinal webs and a triangular profile cross-section.

4. The revolving tower crane of claim 1, wherein the guying is configured as a single strand.

5. The revolving tower crane of claim 1, wherein a guying tip is releasably fastened to the articulation piece to which the guying tip of the guying for the outer boom part is lashed.

6. The revolving tower crane of claim 1, wherein the counterboom comprises an inner counterboom part configured as a bending beam flexurally rigidly connected to the articulation piece.

7. The revolving tower crane of claim 1, wherein a counterboom guying is lashed to an inner counterboom part.

8. A revolving tower crane comprising:

a boom and a counterboom articulatably connected to an articulation piece, wherein the boom comprises an outer boom part articulatably pivotally connected to an inner boom part, wherein the outer boom part is held by a guying, and wherein the inner boom part comprises a bending beam flexurally rigidly connected to the articulation piece;

a guying tip releasably fastened to the articulation piece to which the guying tip of the guying for the outer boom part is lashed; and different guying tips having different heights, and wherein the different guying tips are on and rigidly fastened to the articulation piece.

9. The revolving tower crane of claim 1, wherein a guying is guided continuously free of support from the outer boom part at an acute angle over the inner boom part increasing toward the guying tip.

10. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein the guying is guided from the outer boom part over a guying support and is connected in an articulated manner at an inner articulation point via or at the articulation piece.

11. The revolving tower crane of claim 10, wherein the inner boom part has a profile cross-sectional height larger than a maximum profile cross-sectional height of the outer boom part and/or has a profile cross-sectional area larger than a maximum profile cross-sectional area of the outer boom part.

12. The revolving tower crane of claim 10, wherein the guying is guided from the guying support approximately in parallel with the longitudinal axis of the inner boom part inwardly to a guying tip seated on the articulation piece.

13. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein the guying is guided inwardly from a guying support, falling toward the articulation piece at an acute angle to the longitudinal axis of the inner boom part and, wherein the guying is lashed to the articulation piece.

14. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein a guying support is in a region of a joint between the inner and outer boom parts.

15. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein a guying support projects over the inner boom part by a height that is from 25% to 200% of a height of a profile of the inner boom part.

16. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, wherein the counterboom comprises an inner counterboom part configured as a bending beam flexurally rigidly connected to the articulation piece, and wherein the counterboom comprises an outer counterboom part articulatably pivotally connected to the inner counterboom part and held by a counterboom guying.

17. The revolving tower crane of claim 16, wherein the inner counterboom part is held free of guying.

18. The revolving tower crane of claim 17, wherein the counterboom guying is lashed to a guying tip to which the guying for the boom is lashed.

19. The revolving tower crane of claim 16, wherein the counterboom guying is lashed to a guying tip to which the guying for the boom is lashed.

20. A revolving tower crane comprising:

a boom and a counterboom articulatably connected to an articulation piece, wherein the boom comprises an outer boom part articulatably pivotally connected to an inner boom part, wherein the outer boom part is held by a guying, wherein the inner boom part comprises a bending beam flexurally rigidly connected to the articulation piece, and wherein a counterboom guying is guided over a guying support whose height at least approximately corresponds to a height of a guying tip so that the counterboom guying extends approximately horizontally between the guying support and the guying tip.

* * * * *